United States Patent
Moore

4,198,675
Apr. 15, 1980

[54] LINEARIZATION TECHNIQUE FOR CLOSED-LOOP ACOUSTO-OPTIC MODULATORS

[75] Inventor: George S. Moore, W. Lafayette, Ind.

[73] Assignee: Harris Corporation of Cleveland, Ohio, Cleveland, Ohio

[21] Appl. No.: 907,703

[22] Filed: May 19, 1978

[51] Int. Cl.$^2$ .......................... G06G 7/20; G01J 1/32; H04B 9/00

[52] U.S. Cl. .................................. 364/525; 250/205; 331/94.5 S; 328/144; 364/573; 364/814

[58] Field of Search ............... 364/573, 813, 814, 857, 364/525; 328/144; 324/132; 332/7.51; 331/94.5 S, 94.5 M, 94.5 T; 250/199, 205, 206

[56] References Cited

U.S. PATENT DOCUMENTS

| | | | |
|---|---|---|---|
| 3,517,179 | 6/1970 | Herndon | 364/814 X |
| 3,585,392 | 6/1971 | Korpel | 332/7.51 X |
| 3,633,124 | 1/1972 | Danielmeyer | 331/94.5 M |
| 3,727,062 | 4/1973 | Foster | 250/199 |
| 3,879,687 | 4/1975 | Daehlin et al. | 332/7.51 |
| 3,898,447 | 8/1975 | Bozarth, Jr. | 364/814 X |
| 4,092,530 | 5/1978 | Wise | 331/94.5 S X |

FOREIGN PATENT DOCUMENTS

| | | | |
|---|---|---|---|
| 1413655 | 11/1975 | United Kingdom | 364/814 |
| 1484733 | 9/1977 | United Kingdom | 364/813 |

*Primary Examiner*—Joseph F. Ruggiero

*Attorney, Agent, or Firm*—Craig and Antonelli

[57] ABSTRACT

Linearization of a closed-loop acousto-optic modulation system is maintained over a uniform closed-loop bandwidth that is independent of the output light intensity level through the use of a compensating square-root function generator which employs the third quadrant characteristic of a MOSFET. The MOSFET may be connected as the feedback impedance of an operational amplifier which provides the square-root gain control function for complementing the non-linearity of the acousto-optic modulator. By utilizing the third quadrant characteristics of the source-to-drain voltage relative to the drain current of the MOSFET, the square-root function generator has a transfer function which insures that a linear relationship between modulator output light intensity and input signal current can be obtained irrespective of light intensity.

In accordance with a preferred embodiment of the present invention, the operational amplifier of the square-root function generator may be supplied with an offset voltage in order to insure that the desired square-root transfer function can be attained regardless of differences in the manufactured characteristics of the field effect transistors that may be used. Temperature compensation circuitry may also be adopted as part of the square-root gain control component of the system to counteract the temperature sensitivity of the MOSFET's square-root current-voltage characteristic.

24 Claims, 5 Drawing Figures

LINEARIZATION TECHNIQUE FOR CLOSED-LOOP ACOUSTO-OPTIC MODULATORS

FIELD OF THE INVENTION

The present invention relates to optical modulation systems, and is particularly directed to a technique for providing a linear relationship between output light intensity and an input signal to an acousto-optic modulator system over a uniform bandwidth and which is independent of the operating level, in a closed-loop acousto-optic modulator system.

BACKGROUND OF THE INVENTION

In a closed-loop optical modulation system, the intensity of a modulated optical output beam may be monitored and an electrical signal which controls the modulation of the beam may be appropriately adjusted in an effort to stabilize the operation of the system. In an optical modulation system employing an acousto-optic modulator, system control is affected by the non-linearity of the transfer function of the modulator itself. That is, an acousto-optic modulator may operate so as to deflect light in proportion to the input power to the modulator. To monitor the output light intensity of the modulator, a photodetector is usually optically coupled, as by way of a beam splitter, to the output beam, and the photodetector generates an output the magnitude of which is proportional to the detected light intensity. Since this detected output is fed back to the modulator as a control signal, it can be seen that there is an inherent square law non-linearity in the modulator control loop, input power to the modulator being proportional to the square of current.

An exemplary configuration of a closed loop acousto-optic modulator is depicted in FIG. 1. The output beam 17 from a laser 16 passes through a suitable acousto-optic modulator (AOM) 15, whereby beam 17 is deflected in accordance with the modulation input power supplied from a suitable modulation source, such as a mixer 14. Mixer 14 modulates the output of an RF oscillator in accordance with an information signal input coupled through signal combining circuit 11, such as a suitable summing amplifier, and subjected to appropriate gain control in gain control circuit 12. The deflected output beam 18 from acousto-optic modulator 15 is separated into an output component 20 and a feed-back or control component 22 by a suitable beam splitter 19. The feed-back component 22 may impinge upon a photodetector 21 which produces an output, the magnitude of which is proportional to the intensity of the light impinging upon the detector. This photodetector output is fed back to signal combining circuit 11 to adjust the magnitude of the signal current supplied to mixer 14, in order that the output light intensity may be controlled in accordance with the input signal in the presence of light beam intensity fluctuations.

Due to the non-linearity in the loop created by the square law relationship between the deflection of beam 17 by acousto-optic modulator 15 and the modulation signal current supplied by mixer 14, it has heretofore not been possible to provide a uniform bandwidth independent of output light intensity level.

SUMMARY OF THE INVENTION

In accordance with the present invention, the above-described square law non-linearity in the loop is compensated by a scheme which provides a uniform bandwidth of a closed-loop acousto-optic modulation system which is independent of the output light intensity level. For this purpose, gain control is effected through the use of a square-root function generator which employs the third quadrant characteristic of a MOSFET. The MOSFET may be connected as the feed-back impedance of an operational amplifier which provides the square-root gain control function for complementing the non-linearity of the acousto-optic modulator. By utilizing the third quadrant characteristics of the source-to-drain voltage relative to the drain current of the MOSFET, the square-root function generator has a transfer function which insures that a linear relationship between modulator output light intensity and input signal current can be obtained irrespective of the light intensity level.

In accordance with a preferred embodiment of the present invention, the operational amplifier of the square-root function generator may be supplied with an offset voltage in order to insure that the desired square-root transfer function can be attained regardless of differences in the manufactured characteristics of the field effect transistors that may be used. Temperature compensation circuitry may also be adopted as part of the square-root gain control component of the system to counteract the temperature sensitivity of the MOSFET's square-law current-voltage characteristic.

DETAILED DESCRIPTION

Figure 2:
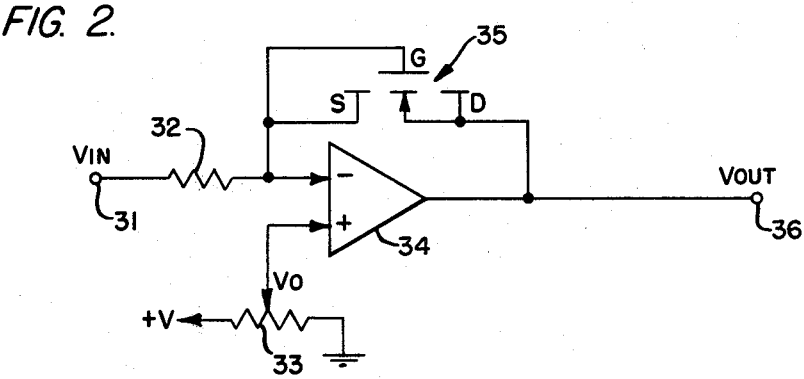
FIG. 2 is a schematic diagram of a square-root function generator employing a metal-oxide semi-conductor field effect transistor (MOSFET)
Figure 3:
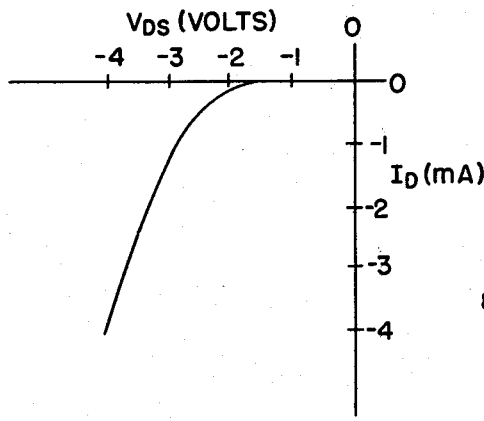
FIG. 3 is a graph illustrating the third quadrant characteristics of the drain-source voltage relative to drain current of a MOSFET.

Referring to FIG. 2, there is shown a square-root function generator which may be employed in a closed-loop acousto-optic modulator in accordance with the present invention. The generator comprises an operational amplifier 34, the positive input terminal of which is coupled to the variable tap of a potentiometer 33, to provide an adjustable offset voltage between $+V$ volts and ground potential. Input voltage terminal 31 is coupled via resistor 32 to the feedback/summing terminal of operational amplifier 34. Voltage output terminal 36 is connected via a MOSFET 35 to the summing terminal of the amplifier. MOSFET 35 has its source and gate connected in common, while the substrate and drain are shorted together and connected to output terminal 36. The third quadrant characteristic of MOSFET 35, shown in FIG. 3, may be defined by the relationship $I_D = -(V_{DS} - V_O)^2$ for the square-root function generator shown in FIG. 2, where $I_D$ is the MOSFET drain current, $V_{DS}$ is the drain source voltage, and $V_O$ is the offset voltage from potentiometer 33. Because of this relationship, the output/input characteristic of FIG. 2 yields a square-root transfer function; namely, $V_{OUT} \alpha \sqrt{V_{IN}}$, so that $V_{OUT}^2 \alpha V_{IN}$.

Figure 1:
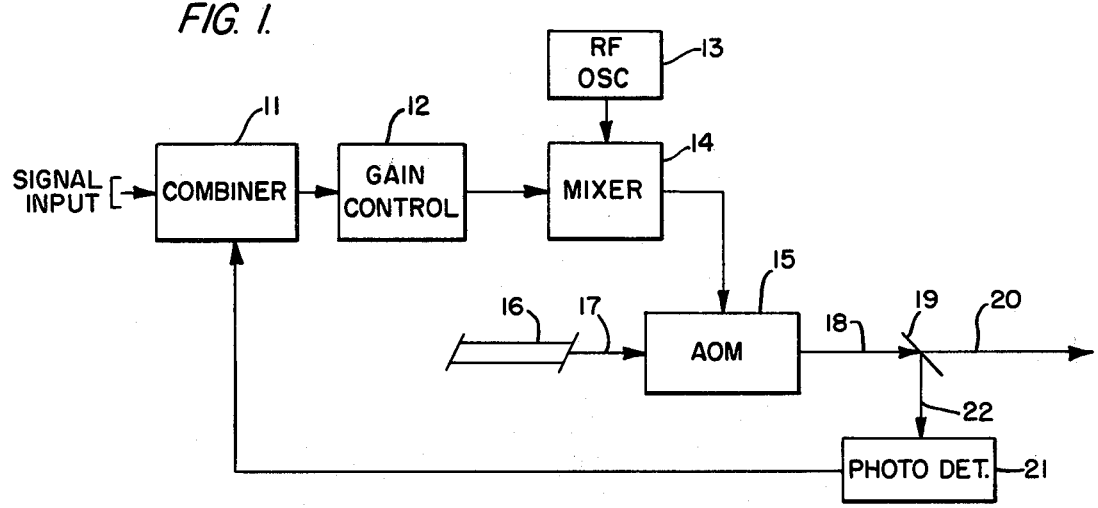
FIG. 1 depicts a block diagram of a closed-loop acousto-optic modulator system.
Figure 4:
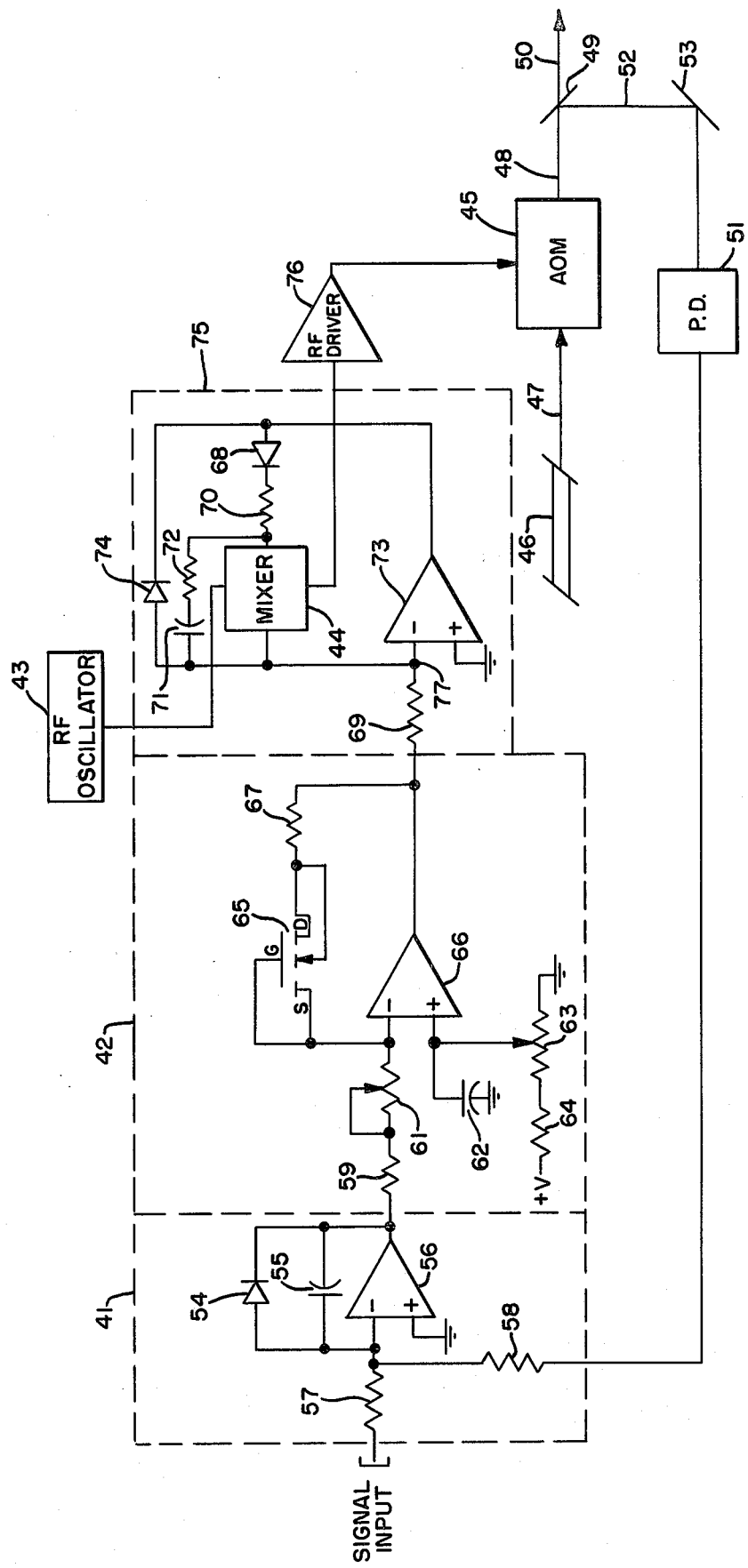
FIG. 4 is a schematic diagram of a closed-loop acousto-optic modulator employing a MOSFET-configured square-root generator in accordance with the present invention.

A closed-loop acousto-optic modulator, in accordance with the present invention, employing the MOSFET-configured square-root function generator shown in FIG. 2, is illustrated in FIG. 4. Like the configuration shown in FIG. 1, FIG. 4 depicts a laser 46 supplying a light beam 47 to a suitable acousto-optic modulator 45. Modulator 45 deflects beam 47 in accordance with the square of the modulation voltage output of mixer 44 (i.e. in proportion to the power in the RF modulation output signal) and produces a deflected beam 48. Beam 48 is separated into an output component 50 and a feedback component 52 by beam splitter 49. After reflecting off mirror 53, beam 52 impinges upon photodetector 51, which produces an output voltage proportional to the intensity of the output of acousto-optic modulator 45. An input signal which is to control the modulation of acousto-optic modulator 45, and with respect to which the output light intensity is to be linearly proportional, is applied to resistor 57 which is coupled together with resistor 58 to the input summing junction of operational amplifier 56. Resistor 58 couples the output of photodetector 51 to amplifier 56. Amplifier 56 has diode 54 and capacitor 55 coupled across its input and output so that signal combining circuit 41 effectively integrates the sum of the input signal and feedback current from photodetector 51. Also, loop gain may be coarsely adjusted by varying the value of the capacitor 55. The integrating nature of signal combining circuit 41 produces the voltage offset required by square-root function generator 42.

Square-root function generator 42 includes operational amplifier 66 across the input and output of which MOSFET 65 is coupled in series with resistor 67. Resistor 67 may be used to partially compensate for saturation effects in acousto-optic modulator 45 and/or mixer 44, and RF driver 76. The primary effect of resistor 67 is to increase incremental gain at higher operating points. Depending upon RF driver 76 and the peak diffraction efficiency desired, the compensation provided by resistor 67 may or may not be necessary. The output of amplifier 56 is coupled through resistor 59 and variable resistor 61 to the junction of feedback MOSFET 65 and the negative input of operational amplifier 66. Variable resistor 61 may be used to adjust loop gain over a relatively narrow range. The positive input of operational amplifier 66 is coupled to the variable tap of a potentiometer 63, which is connected in series with resistor 64 between a reference offset voltage (+V) terminal and ground. The series value of resistor 64 and potentiometer 63 is adjusted to produce an offset voltage $V_O$, so as to provide zero volts out for zero volts in. The positive input terminal of operational amplifier 66 is also capacitor-coupled to ground via capacitor 62, to filter out noise spikes.

The output of square-root function generator 42 is coupled to a linear mixer driver 75. Mixer driver 75 contains an operational amplifier 73 the output of which is coupled to negative input summing junction 77 through diode 74 and a series circuit consisting of diode 68, resistor 70, and the floating I port of a doubly-balanced mixer 44. A series circuit of capacitor 71 and resistor 72 which form a high-pass load are coupled across mixer 44 to properly terminate the mixer at the carrier frequency output of RF oscillator 43. Mixer 44 is provided as a non-linear load in the feedback path of operational amplifier 73, so as to avoid low incremental gain at low operating levels. The output of mixer 44 is coupled as the modulating input of acousto-optic modulator 45 through RF drive 76. Resistor 70 permits amplifier 73 to operate above the several tenths of a volt required by mixer 44, thereby reducing distortion and improving response. Diode 68 prevents mixer 44 from turning on for invalid negative input signals from square-root function generator 42, so as to negate the possibility of creating a positive feedback mode and possible latchup of the system. Diode 74 provides a low impedance feedback path for amplifier 73 in this case.

In operation, an input signal which is to control the deflection of laser beam 47 by modulator 45 is applied to signal combining circuit 41 wherein it is summed with an intensity representative signal from photodetector 51 and integrated. The resultant signal is applied via square-root function generator 42 to mixer driver 75. The RF output of generator 43 is mixed with the output of square-root function generator 42 in mixer 44 and the product is coupled via RF driver 76 to acousto-optic modulator 45 to controllably deflect beam 47. Fluctuations in the light beam intensity are monitored by photodetector 51 and fed back to signal combining circuit 41 so that the output light intensity of modulator 45 will be controlled essentially in accordance with the signal input. Because of the fidelity of the third quadrant characteristic of FET 65, shown in FIG. 3, to a square law relationship between drain-source voltage and drain current over a wide bandwidth, a linear relationship between the output light intensity and system input signals in the presence of light beam fluctuations is achieved over a wide bandwidth.

Figure 5:
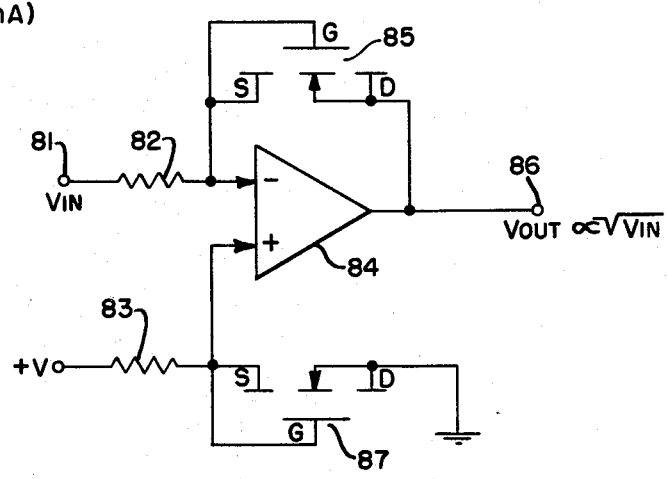
FIG. 5 is a schematic diagram of a MOSFET-configured square-root function generator with a temperature compensation bias circuit.

In the square-root generator configurations shown in FIGS. 2 and 4, the potentiometer-controlled offset voltage may vary from MOSFET to MOSFET and may exhibit a sizeable sensitivity to temperature change. Therefore, it is highly desirable that power dissipation be kept as low as possible. FIG. 5 depicts a modification of the square-root function generator having a temperature compensation circuit. In addition to feedback MOSFET 85, connected across amplifier 84, the circuit includes a temperature compensating offset voltage ($V_O$) bias supply circuit consisting of resistor 83 and MOSFET 87 series connected between a reference voltage (+V) terminal and ground. A signal input voltage is applied to terminal 81 and is coupled to amplifier 84 via summing resistor 82. The output voltage $V_{OUT}$ at terminal 86 is proportional to the square-root of the input voltage $V_{IN}$ and, with MOSFETS 85 and 87 properly matched, thermal variations in MOSFET 85 are compensated by equal variations in MOSFET 87, so that the relationship $V_{OUT} \alpha \sqrt{V_{IN}}$ is maintained.

It is also possible to implement the present invention by employing a MOSFET in the feedback loop of the square-root function generator which has a relatively small offset voltage. As described in "Electronics Principles—Physics, Models, and Circuits", by P. E. Gray and C. L. Searle, John Wiley and Sons, Inc., 1969, the drain current versus drain source voltage may be modeled by:

$$I_D = h\mu_e\epsilon/WL[-V_{DS}^2/2]$$

where
 h = channel width,
 $\mu_e$ = electron mobility,
 $\epsilon$ = dielectric permitivity,
 W = oxide layer thickness, and L=channel length.

None of the above terms has a strong temperature sensitivity for temperatures typically encountered in the system, so that for an appropriately selected transistor, voltage offset circuitry may be omitted.

As will be appreciated from the foregoing description of the invention, because the third quadrant square law characteristic of a field effect transistor in the square-root function generator enables the function generator to faithfully provide an output proportional to the square-root of the input over a wide bandwidth, the output of the acousto-optic modulator can be stabilized for a wide range of modulation input signals, thereby providing a uniform closed-loop bandwidth independent of light intensity. Moreover, the fidelity of the square-root function can be maintained irrespective of the characteristics of the particular field effect transistor selected by a voltage offset/temperature-compensating circuit.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. In a closed loop optical modulation system wherein an output beam of light is monitored and a signal representative of the output beam is fed back to be combined with an input signal and compensate for fluctuations in said output beam, the improvement comprising means for compensating for a square law non-linearity in the modulation transfer function of the system.

2. The improvement according to claim 1, wherein said means comprises a square-root function generator disposed in the path of the combined input and fed-back signals.

3. The improvement according to claim 1, wherein said square-root function generator has a transfer function which is defined in accordance with a non-linear characteristic of a field effect transistor.

4. The improvement according to claim 3, wherein said square-root function generator comprises an amplifier having a first input and an output between which a field effect transistor is coupled.

5. The improvement according to claim 4, wherein said square-root function generator further includes a second input to which is coupled means for supplying an offset voltage for setting the operation of said square-root function generator relative to said non-linear characteristic of said field effect transistor.

6. The improvement according to claim 5, wherein said offset voltage is adjustable.

7. The improvement according to claim 3, wherein said non-linear characteristic of said field effect transistor corresponds to the relationship between the drain-source voltage and the drain current of said field effect transistor.

8. The improvement according to claim 7, wherein said field effect transistor has one of the source and drain thereof connected in common with the gate thereof.

9. The improvement according to claim 3, wherein said field effect transistor has one of the source and drain thereof coupled to the output of said amplifier, while the other of the source and drain of said field effect transistor is connected in common with the gate thereof and with the first input of said amplifier.

10. The improvement according to claim 9, wherein said square-root function generator further includes a second input to which is coupled means for supplying an offset voltage for setting the operation of said square-root function generator relative to said non-linear characteristic of said field effect transistor.

11. The improvement according to claim 10, wherein said offset voltage supplying means further comprises means for compensating for the temperature sensitivity of the non-linear characteristic of said field effect transistor.

12. The improvement according to claim 11, wherein said temperature sensitivity compensating means comprises a further field effect transistor coupled between the second input of said amplifier and a source of reference potential.

13. The improvement according to claim 1, wherein said optical modulation system includes an acousto-optic modulator to which a beam of light to be modulated is applied, the intensity of the output beam of which is detected and an electrical signal representative thereof combined with said input signal in a summing integrator circuit.

14. The improvement according to claim 13, wherein the output of said summing integrator is coupled to said compensating means, and further including modulation signal generation means, coupled to the output of said compensating means and to a reference signal source, for modifying the output of said reference signal source in accordance with the output of said compensating means and applying the resultant modified output to said acousto-optic modulator.

15. The improvement according to claim 13, wherein said compensating means includes a square-root function generator comprising an amplifier having a first input and an output between which said field effect transistor is coupled.

16. A square-root function generator comprising:
an operational amplifier having a first input and an output; and
a field effect transistor, one of the source and drain of which is coupled to the output of said operational amplifier, and the other of the source and drain of which is connected in common with the gate of said transistor and the first input of said operational amplifier.

17. The improvement according to claim 16, wherein said operational amplifier has a second input, and wherein said function generator further includes means for supplying an offset voltage to said second input for setting the operation of said square-root function generator relative to the square law relationship between the source-drain voltage and the drain current of said field effect transistor.

18. The improvement according to claim 17, wherein said offset voltage is adjustable.

19. The improvement according to claim 18, wherein said offset voltage supplying means further comprises means for compensating for the temperature sensitivity of said square law relationship of said field effect transistor.

20. The improvement according to claim 19, wherein said temperature sensitivity compensating means comprises a further field effect transistor coupled between the second input of said amplifier and a source of reference potential.

21. A square-root function generator comprising:
an operational amplifier having a first input and an output; and
a field effect transistor, coupled between the first input and the output of said amplifier in such a manner that the output of said operational amplifier is defined in accordance with the square law relationship between the source-drain voltage and drain current of said field effect transistor; and
wherein said operational amplifier has a second input, and wherein said function generator further includes means for supplying an offset voltage to said second input for setting the operation of said square root function generator relative to the square law relationship between the source-drain voltage and the drain current of said field effect transistor.

22. The improvement according to claim 21, wherein said offset voltage is adjustable.

23. The improvement according to claim 22, wherein said offset voltage supplying means further comprises means for compensating for the temperature sensitivity of said square law relationship of said field effect transistor.

24. The improvement according to claim 23, wherein said temperature sensitivity compensating means comprises a further field effect transistor coupled between the second input of said amplifier and a source of reference potential.

* * * * *